United States Patent [19]

Tsuruta et al.

[11] Patent Number: 4,607,308
[45] Date of Patent: Aug. 19, 1986

[54] MAGNETIC TAPE CASSETTE WITH DUAL GUARD PANEL STRUCTURE

[75] Inventors: Masao Tsuruta; Kengo Oishi; Osamu Suzuki, all of Kanagawa, Japan

[73] Assignee: Fuji Photo Film Co., Ltd., Kanagawa, Japan

[21] Appl. No.: 586,389

[22] Filed: Mar. 5, 1984

[30] Foreign Application Priority Data

Mar. 4, 1983 [JP] Japan .................. 58-30414[U]

[51] Int. Cl.$^4$ .................. G11B 23/02; G11B 15/32
[52] U.S. Cl. .................. 360/132; 242/197
[58] Field of Search .................. 360/132, 96.6, 93, 85, 360/83, 90; 242/197, 198, 199

[56] References Cited

U.S. PATENT DOCUMENTS 4,418,373  11/1983  Fujimori et al. .................. 360/132
4,449,677  5/1984  Ohta et al. .................. 360/132

Primary Examiner—John H. Wolff
Assistant Examiner—Andrew L. Sniezek
Attorney, Agent, or Firm—Sughrue, Mion, Zinn, Macpeak and Seas

[57] ABSTRACT

A magnetic tape cassette having an improved guard panel structure for eliminating dust and the like from entering the cassette when the cassette is not being used. The guard panel of the cassette of the invention has a dual-cover structure, including an outer cover which covers the opening through which the tape is pulled from the cassette, and an inner cover having guide protrusions slidably engaged with guide grooves formed in the inner side walls of tape withdrawal holes provided at the opposite sides of the opening and pivotally supported on the outer cover to move in association with the outer cover. In one embodiment, one of the grooved side walls which form the guide grooves is made elastic to push the other guide protrusion into elastic abutment with the opposite side wall. In another embodiment, a leaf spring is fixed to the body of the cassette and elastically engages one of the guide protrusions.

5 Claims, 4 Drawing Figures

MAGNETIC TAPE CASSETTE WITH DUAL GUARD PANEL STRUCTURE

BACKGROUND OF THE INVENTION

The present invention relates to magnetic tape cassettes, and more particularly to a video magnetic tape cassette which has a guard panel adapted to cover a tape withdrawal opening which is formed in the front part of the cassette body.

When a video magnetic tape cassette is loaded into the magnetic recording and reproducing device (VTR—Video Tape Recorder), a mechanism in the VTR pulls the magnetic tape out of the cassette through an opening formed in the front part of the cassette for recording or reproducing signals. When the cassette is not in use, the opening is closed by a guard panel, which is urged to close the opening at all times, in order to protect the tape and prevent the entrance of dust into the cassette.

The guard panel is a substantially U-shaped structure having a front wall adapted to cover the front part of the opening and side walls extending from opposite ends of the front wall perpendicular to the front wall. These side walls are pivotally supported on the side walls of the cassette so that the opening can be opened or closed by the guard panel. The guard panel is locked at its closed position by a locking member.

Recently, portable video systems usable outdoors have been developed. A small cassette used in such a system is more likely to suffer from the trouble that dust or the like sticks to the surface of the magnetic tape than in a conventional stationary video system.

In view of the foregoing, an object of the invention is to provide a magnetic tape cassette in which the tape withdrawal opening is positively closed when the cassette is not in use.

SUMMARY OF THE INVENTION

The foregoing objects of the invention have been achieved by the provision of a magnetic tape cassette in which a magnetic tape is wound on a pair of hubs and an opening formed in the front part of a cassette body is covered by a guard panel which is swingably supported, in which, according to the invention, the guard panel is of a dual-cover structure including an outer cover for closing the opening and an inner cover which has guide protrusions slidably engaged with guide grooves formed in the inner side walls of tape withdrawal holes provided at both ends of the opening and which is pivotally supported on the outer cover to move in association with the outer cover. In this cassette, one of the grooved side walls which form the guide grooves causes each guide protrusion to elastically abut against the other grooved side wall.

DESCRIPTION OF THE PREFERRED EMBODIMENTS

Figure 1:
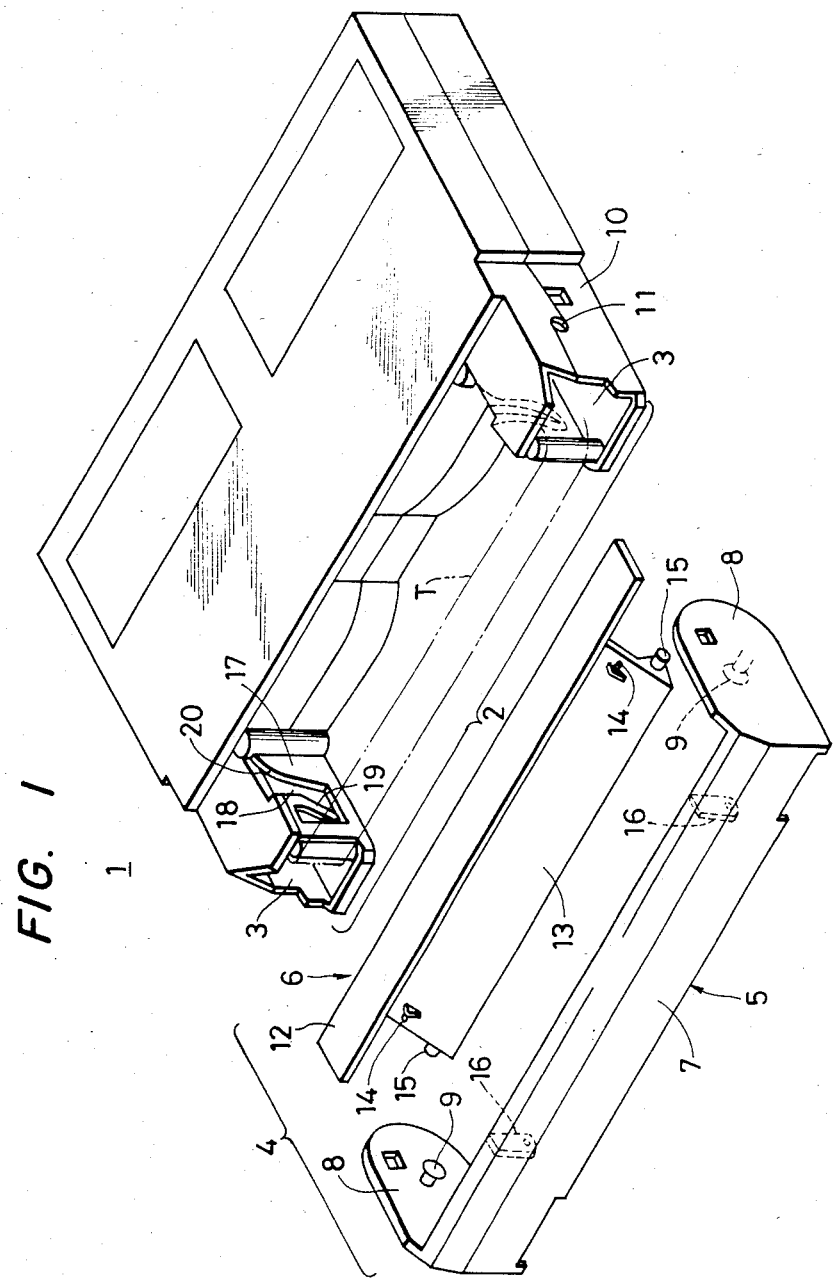
FIG. 1 is a perspective view showing an example of a magnetic tape cassette constructed according to the invention.

A preferred embodiment of a magnetic tape cassette constructed according to the invention will be described with reference to the accompanying drawings of which FIG. 1 is an exploded perspective view showing an example of a guard panel used in the cassette of the invention.

The cassette 1, as shown in FIG. 1, accommodates a magnetic tape T in such a manner that the tape can be pulled out of the cassette through tape withdrawal holes 3 which are provided on both sides of a front opening 2. The front opening 2 is covered by a guard panel 4 having a dual structure, composed of an outer cover 5, which is substantially U-shaped, and an inner cover 6, which is substantially T-shaped. The guard panel 4 is pivotally mounted on both side walls of the cassette 1 and is urged by an elastic member (not shown) to close the opening at all times.

The outer cover 5 includes a front wall 7 adapted to cover the magnetic surface of the magnetic tape T and side walls 8 which extend from both ends of the front wall 7 perpendicular to the front wall 7.

Supporting shafts 9 extend from the inner surfaces of the side walls 8. The shafts 9 are engaged with circular holes 11 in the outer side walls 10 of the cassette which are located near the tape withdrawal holes 3 and define the outer side walls of the withdrawal holes, so that the outer cover 5 is swingably mounted on the side walls of the cassette.

The center of each circular hole 11 lies on the interface of the side walls of the upper and lower halves of the cassette. In other words, each circular hole 11 is formed by combining the upper and lower halves which have semicircular cuts in the side walls.

The inner cover 6 includes the upper wall 12, adapted to cover the opening 2 from above, and a base wall 13, inclined towards the front wall 7 of the outer cover 5 and adapted to cover the base side of the magnetic tape T. The base wall 13 extends from the lower surface of the upper wall 12 so that the inner cover 6 is substantially T-shaped in section. The base wall 13 has short shafts 14 which are formed at the middles of both end portions of the surface which confronts the front wall 7. The base wall 13 has guide protrusions 15 on both ends thereof.

The short shafts 14 of the inner cover 6 are supported by a pair of ribs 16 which extend from the inner surface of the front wall of the outer cover 6. The guide protrusions 15 of the inner cover 6 are slidably fitted in guide grooves 18 which are formed in the cassette's inner walls 17 which define the inner side wall of each of the tape withdrawal holes 3.

Each guide groove 18 has groove walls including a front groove side wall 19, which is an elongated part extending from the cassette body and a back groove wall 20. The front grooved side wall 19 is so designed that its end is movable slightly back and forth.

The operation of the guard panel 4 thus constructed will be described with reference to FIGS. 2 and 3.

Figure 2:
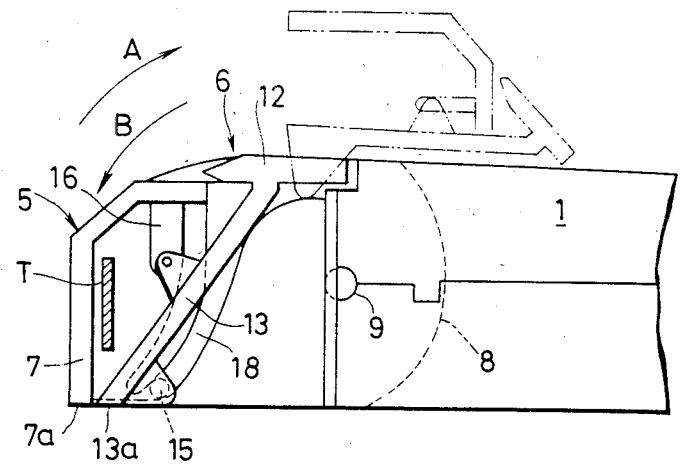
FIG. 2 is a side view outlining the arrangement of the essential components of the guard panel of the cassette used for a description of the guard panel.
Figure 3:
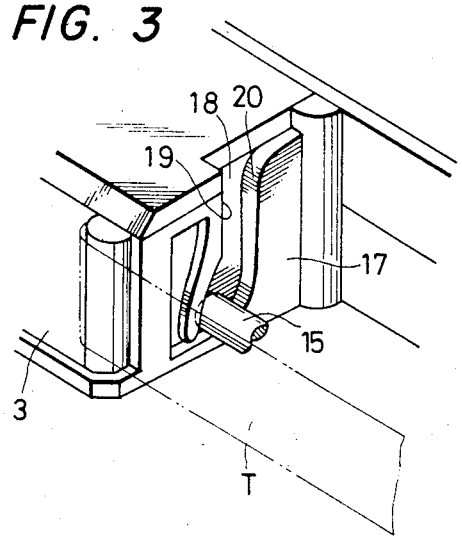
FIG. 3 is an enlarged perspective view showing essential components of the cassette according to the invention.

FIGS. 2 is a side view outlining the arrangement of the essential components of the guard panel 4 and is used for a description of the operation of the latter. FIG. 3 is an enlarged perspective view of the cassette's inner wall 17 forming a part of the tape withdrawal hole 3 and the guide protrusion 15.

When the cassette 1 is loaded into the VTR, the outer cover 5 is turned through approximately 90 about the supporting shafts 9 on the side walls 8 so that it is set above the cassette body, being turned in the direction of the arrow A. In this operation, the inner cover 6 is lifted while being supported by the ribs 16. Therefore, while the guide protrusions 15 are being guided by the guide grooves 18 and the distance between the lower edge 13a of the base wall 13 and the lower edge 7a of the front wall 7 is increasing, the inner cover 6 and the outer cover 5 are moved to positions indicated by the two-dotted chain lines. As a result, the opening 2 of the cassette 1 is opened so that the magnetic tape lying across the opening 2 is released.

The outer cover 5 of the guard panel 4 is urged to close the opening, in the direction of the arrow B in FIG. 2, by a spring member (not shown) at all times. Therefore, when the cassette 1 is unloaded from the VTR, the outer cover 5 and the inner cover 6 are turned in the direction of the arrow B so that the covers 5 and 6 cover both sides of the magnetic tape T lying across the opening 2 while the opening 2 is automatically closed.

As is apparent from the above description, the inner cover 6 moves in association with the movement of the outer cover 5. In order to allow the inner cover 6 to positively and smoothly move, the guide protrusions 15 are guided by the guide grooves 18. In order to smoothly move the guide protrusions 15 in the guide grooves 18, the latter should be sufficiently large in width. However, if the width is excessively large, the inner cover 6 is not sufficiently fixed when the cassette is not in use.

In the cassette of the invention, one groove side wall 19 forming each guide groove 18 is made of an elastic material so that the guide protrusion 15 is pushed against the other or back groove side wall 20 at all times. Also, there is provided a clearance below the elastic member so that the lower end is movable back and forth, whereby the guide protrusion 15 is held stable when the opening is closed. The one grooved side wall 19 is manufactured by molding.

Figure 4:
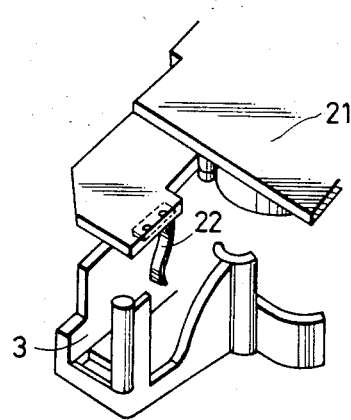
FIG. 4 is an exploded perspective view showing the essential components of a modification of the cassette according to the invention.

FIG. 4 shows a modification of the magnetic tape cassette of the invention. In the modification, instead of the elastic grooved side wall 19, a leaf spring 22 is secured at one end to the lower surface of the upper half 21 which forms a part of the tape withdrawal hole 3.

As is clear from the above description, according to the invention, when the cassette 1 is not in use, each guide protrusion 15 of the inner cover 6 is held by the elastic grooved side wall 19 of the guide groove 18 or the leaf spring 22, and therefore the guard panel 4 is positively held at the closed position without play, thus effectively preventing the entrance of dust into the cassette. Furthermore, since the guide protrusions 15 of the inner cover 6 are guided while abutting against the groove side wall 19 of the leaf spring 22, the inner cover 6 can be smoothly moved to open or close the opening of the cassette.

We claim:

1. In a magnetic tape cassette in which a magnetic tape is wound on a pair of hubs and an opening formed in the front part of a cassette body is covered by a guard panel which is swingably supported, in which the improvement comprises: said guard panel is of a dual-cover structure comprising an outer cover for closing said opening and an inner cover having guide protrusions slidably engaged with guide grooves formed in inner side walls of tape withdrawal holes provided at both ends of said opening and being pivotally supported on said outer cover to move in association with said outer cover, said inner side walls each including elastic cantilever means for urging the respective guide protrusion against a groove wall, to assist in the movement of and improve positioning of the inner dust cover.

2. The magnetic tape cassette of claim 1, wherein said outer cover is substantially U-shaped and said inner cover is substantially T-shaped.

3. The magnetic tape cassette of claim 2, wherein said inner cover comprises first and second short shafts engaged with corresponding ribs formed on said outer cover.

4. The magnetic tape cassette of claim 1, wherein said inner side walls of said withdrawal holes include front and back groove walls, at least one of said front and back groove walls being elastic to urge the guide protrusion toward the other of said front and back groove walls.

5. The magnetic tape cassette of claim 1, wherein said elastic means comprises a leaf spring rigidly affixed to said cassette body and elastically engaged with a corresponding one of said protrusions at least through a portion of a range of movement of said protrusion.

* * * * *